(12) United States Patent
Carlson et al.

(10) Patent No.: US 11,661,342 B2
(45) Date of Patent: *May 30, 2023

(54) STABLE BASIC ELECTROLYTE MATERIAL AND SOLVENT MATERIAL CONTAINING SAME

(71) Applicant: Tygrus, LLC, Troy, MI (US)

(72) Inventors: Lawrence Carlson, Oxford, MI (US); Lawrence Adloff, Placerville, CA (US); Timothy Hoel, Placerville, CA (US); Steven Wurzburger, Goodyears Bar, CA (US)

(73) Assignee: Tygrus, LLC, Troy, MI (US)

( * ) Notice: Subject to any disclaimer, the term of this patent is extended or adjusted under 35 U.S.C. 154(b) by 677 days.

This patent is subject to a terminal disclaimer.

(21) Appl. No.: 16/416,974

(22) Filed: May 20, 2019

(65) Prior Publication Data

US 2019/0270641 A1 Sep. 5, 2019

Related U.S. Application Data

(63) Continuation of application No. 15/158,988, filed on May 19, 2016, now Pat. No. 10,294,104.

(60) Provisional application No. 62/163,941, filed on May 19, 2015.

(51) Int. Cl.
*C01B 17/00* (2006.01)

(52) U.S. Cl.
CPC .................. *C01B 17/00* (2013.01)

(58) Field of Classification Search
CPC .................. C01B 13/0207; C01B 13/00
See application file for complete search history.

(56) References Cited

U.S. PATENT DOCUMENTS

| | | | |
|---|---|---|---|
| 4,101,640 A | 7/1978 | Christe | |
| 5,380,430 A | 1/1995 | Overton et al. | |
| 5,571,336 A | 11/1996 | Wurzburger et al. | |
| 5,575,974 A | 11/1996 | Wurzburger et al. | |
| 5,698,107 A | 12/1997 | Wurzburger et al. | |
| 5,756,051 A | 5/1998 | Overton | |
| 5,830,838 A | 11/1998 | Wurzburger et al. | |
| 5,895,782 A | 4/1999 | Overton et al. | |
| 6,096,222 A | 8/2000 | Wurzburger et al. | |
| 7,513,987 B1 | 4/2009 | Wurzbarger | |
| 10,294,104 B2 * | 5/2019 | Carlson | C01B 17/00 |
| 10,446,327 B2 * | 10/2019 | Carlson | C01B 32/00 |

(Continued)

FOREIGN PATENT DOCUMENTS

WO 2016172687 A1 10/2016

OTHER PUBLICATIONS

European Search Report for Application No./Patent No. 20205053.0-1105, European Patent Office, dated Apr. 6, 2021, 9 pages.

*Primary Examiner* — Peter F Godenschwager
(74) *Attorney, Agent, or Firm* — Young Basile Hanlon & McFarlane, P.C.

(57) ABSTRACT

A method of making an alkaline hydronium composition and composition of matter having the following chemical structure:

$$[H_xO_{x-y}]_mZ_n$$

where x is an integer greater than 3;
y is and integer less than x; and
wherein the charge value associated with the molecular component is at least −1.

17 Claims, 2 Drawing Sheets

(56) References Cited

U.S. PATENT DOCUMENTS 10,798,945 B2 * 10/2020 Carlson .................. A01N 59/02
10,849,343 B2 * 12/2020 Carlson .................. C01F 11/46

* cited by examiner

STABLE BASIC ELECTROLYTE MATERIAL AND SOLVENT MATERIAL CONTAINING SAME

This application is a continuation of U.S. Ser. No. 15/158,988 filed May 19, 2016 which claims priority to U.S. Provisional Application No. 62/163,941 filed May 19, 2015, the contents of which are both incorporated by reference herein.

BACKGROUND

The present invention relates to compositions of matter that can be incorporated into various aqueous solutions that can alter solution pH and can be employed in rendering the resulting solution basic depending on the initial solution composition.

It has been long accepted scientific fact that, based upon laws of thermodynamics, the internal energy of a closed system is stable when the two different charge-types, i.e. moles of positively charged cations (+) and moles of negatively charged anions (−), are stoichiometrically charge-balanced; yielding a stable charge neutral aqueous solution. It has been widely held that electrostatic charge types in a neutral solution will necessarily have positive electrostatic charges (+) balanced by an equal number of negative (−) electrostatic charges. However, studies conducted on aqueous basic solutions indicate that various solutions may possess an excess of hydroxyl radicals.

This phenomenon supports the conclusion that water molecules are effective in stabilizing unbalanced charges present in solution. It is believed that water molecules present in an aqueous solution stabilize any unbalanced charges to yield a charge-balanced solution. The results conform to the laws of thermodynamics and point to the presence of a new type of charge-balancing neucleophile composed of lone pair electrons of water molecules.

Heretofore production of solutions in which an excess of hydroxyl radials stabilized by water molecules could be present for an extended period to yield a charge-balanced solution was illusive. It would be desirable to provide such a material. And to provide a composition of matter, which could provide such solutions.

SUMMARY

Disclosed herein is a composition of matter which when present in a polar solvent will have the following chemical structure:

where x is an integer greater than 3;
y is and integer less than x; and
the charge value associated with the molecular component is at least −1.

Also disclosed herein is a composition of matter having the following formula:

where x is an integer greater than 3;
y is an integer less than x;
m is an integer between 1 and 6;
n is an integer between 1 and 3; and
Z is a monoatomic cation, polyatomic cation or cationic complex.

Also disclosed is a use solution comprising:

wherein x is an integer greater than 3;
y is an integer less than x;
a is a value between 1 and 6;
b is a value between 1 and 3; and
Z is a monoatomic cation, polyatomic cation or cationic complex; and
a solvent selected from the group consisting of water, polar organic solvents and mixtures thereof.

DESCRIPTION OF THE DRAWING

The following drawings have been presented to illustrate the invention as disclosed herein in which.

DETAILED DESCRIPTION

Disclosed herein is a novel electrolyte that can be employed in polar solvents such as aqueous solutions and is broadly construed as a basic or alkaline hydroxonium ion-derived complex. As defined herein "alkaline hydroxonium ion complexes" having at least four oxygen molecules wherein each oxygen molecule is bonded to at least two hydrogen molecule and can be present as its basic salt. In certain embodiments the alkaline hydroxonium ion complexes will exist in polar solutions such as an aqueous solution or a polar organic solvent as a population predominantly composed of atoms having four, five and/or six hydrogen atoms that are bonded to a number of oxygen atoms that is at least one less than the number of hydrogens present.

When the composition of matter as disclosed herein is admixed with an aqueous or polar solvent, the resulting composition is a solution that can be composed of basic or alkaline hydroxonium ions. Suitable alkaline anionic materials can also be referred to as alkaline hydroxoniumion complexes. The composition of matter and solutions that contain the same may have utility in various applications where elevated or alkaline pH is desirable. The materials disclosed herein may also have applicability in situations not limited to certain cleaning and sanitizing applications.

It has been theorized that extreme trace amounts of alkaline anionic hydroxonium may spontaneously form in water from water molecules in the presence of free hydroxyl radicals. Without being bound to any theory, it is believed that naturally occurring stable alkaline anionic hydroxonium ions are extremely rare, if they occur at all. The concentration of naturally occurring alkaline anionic hydroxonium ions in water is estimated to be no more than 1 in 480,000,000. It is also theorized that naturally occurring alkaline anionic hydroxonium ions are unstable transient species with lifespans typically in the range of nanoseconds. Naturally occurring alkaline anionic hydroxonium ions are reactive and are readily solvated by water and, as such, these alkaline anionic hydroxonium ions do not exist in a free state.

The alkaline electrolyte material as disclosed herein, when introduced into aqueous solution or polar solvent is stable and can be concentrated and/or isolated from the associated aqueous solution or polar solvent.

The alkaline electrolyte material component can be produced by the controlled reaction of one or more strong inorganic acids with as suitable strong base. Non-limiting examples of suitable strong inorganic acids are those having a $pK_a \geq 1.74$. The strong inorganic acid material is one which, when added to water, willionize completely in the associated aqueous solution. It is contemplated that the strong acid material component employed can be a mixture of strong inorganic acids. In certain production processes, the strong acid material component may include weaker acids, such as those having a $pK_a < 1.74$, which when added to water, will achieve less than complete ionization in aqueous solution but may have utility in certain applications. In such situations, it is contemplated that the acid mixture composition will have an average $pK_a \geq 1.74$.

In the present disclosure, it has been found quite unexpectedly that the stable alkaline hydronium ion complex produced and as defined herein, when added to an aqueous solution or polar organic solvent or blend of the same, will produce a polar solvent and provide and effective alkaline $pK_a$. which is dependent on the amount of the disclosed stable alkaline hydroxonium ion material that is added to the corresponding solution independent of the presence of any native hydroxyl ion concentration originally present in that solution. The resulting solution can function as a polar solvent and can have an effective $pK_b$ between 7 and 14 in certain applications when the initial solution pH prior to addition of the stable alkaline hydronium ion complex material is between 6 and 8.

It is also contemplated that the stable alkaline hydroxyl ion complex and/or materials containing the same as disclosed herein can be added to solutions having an initial pH in acidic ranges, for example between 2 and 6 to non-reactively adjust the pH of the resulting solution to neutral or alkaline levels and/or to alter the effective or actual $pK_b$ of the resulting solution to levels between 7 and 14, with levels between 8 and 12 being achieved in certain applications. The stable alkaline hydronium complex material as disclosed herein can be added to an acidic material or solution of choice without measurable reactive properties including, but not limited to, exothermicity, oxidation or the like.

The acidity of any theoretical cationic hydronium ions existing in water as a result of aqueous auto-dissociation is the implicit standard used to judge the strength of an acid in water. Strong acids are considered better proton donors than the theoretical cationic hydronium ion material; otherwise a significant portion of introduced acid would exist in a non-ionized state. Strong bases are considered to be better or more efficient hydroxyl donors than the theoretic anionic hydronium material. As indicated previously, heretofore theoretical naturally occurring hydronium ions, either cationic and anionic, that are believed to be derived from aqueous auto-dissociation are unstable as species, random in occurrence and believed to exist, if at all, in extreme low concentrations in an associated aqueous solution. Generally, cationic or anionic hydroxonium ions existing in aqueous solution will be present, if at all, in concentrations between 0 and values less than 1 in 480,000,000.

Cationic hydronium ions can be isolated, if at all, from native aqueous solution via solid or liquid phase organosynthesis as monomers attached to a superacid ligand or solution in structures such as HF—SbF$_5$SO$_2$ in the case of cationic hydronium. Heretofore, there has been no successful attempt yielding isolated stable anionic or alkaline hydronium ion material.

In contrast, the stable alkaline hydroxonium material as disclosed herein provides a source of concentrated alkaline hydroxonium anions when admixed with a suitable aqueous or organic material. The stable alkaline hydroxonium material disclosed herein has an extended shelf life and provides a long-lasting source of available alkaline hydroxonium ion material when added to a solution such as water or a suitable polar solvent. The material disclosed herein maintains performance efficacy over extended or prolonged time periods.

The material disclosed herein is a composition of matter having the following formula:

$$[H_xO_{x-y}]_mZ_n$$

where x is an integer greater than 3;
wherein y is an integer less than x;
m is an integer between 1 and 6;
n is an integer between 1 and 3; and
Z is a monoatomic cation, polyatomic cation or cationic complex.

In certain embodiments, it is contemplated that m can be an integer between 3 and 6. It is also contemplated that in certain embodiments, y can be an have a value of x−1; while in other embodiments, y can have a value of x−3.

Figure 1:
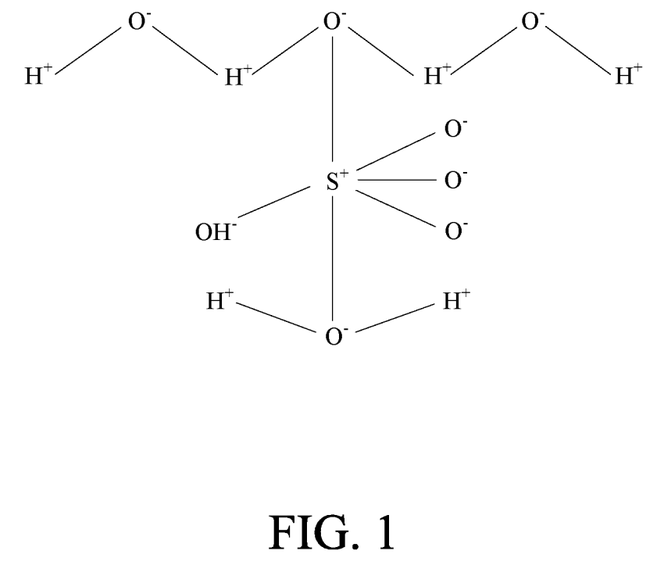
FIG. 1 is a schematic presentation of an embodiment of one of the stable electrolyte complexes as disclosed herein.
Figure 2:
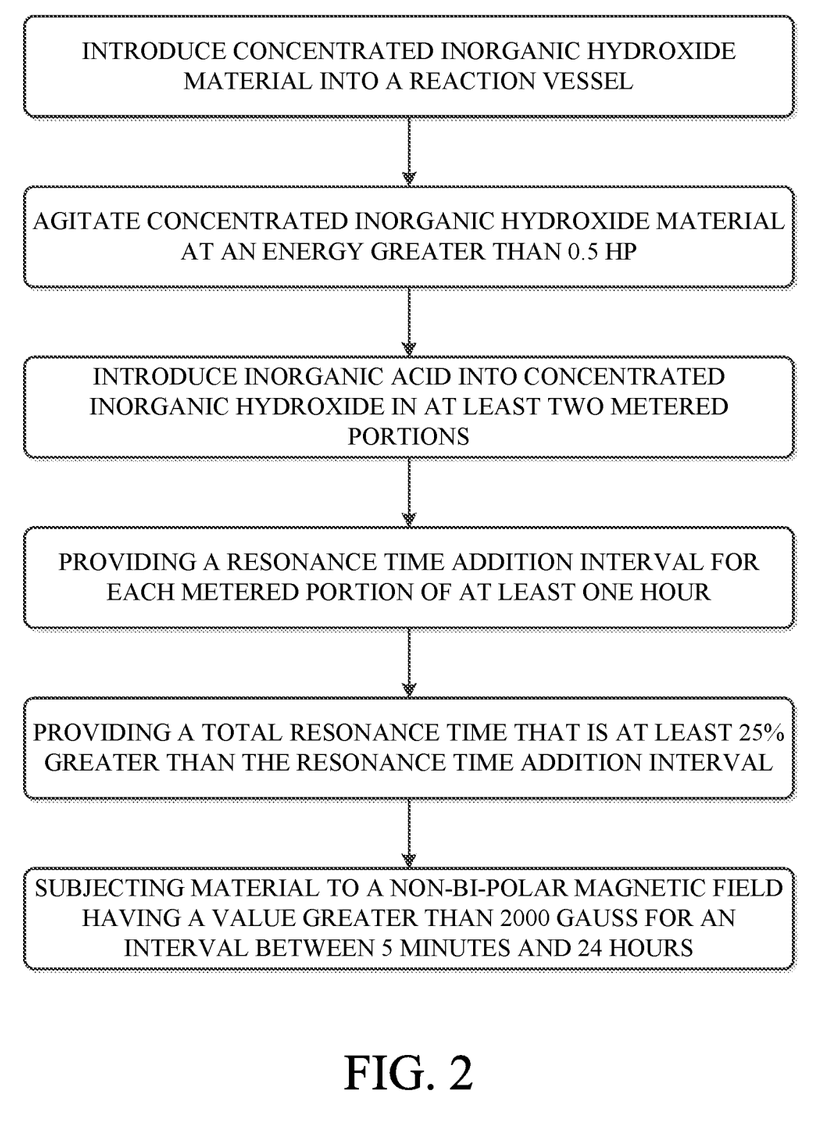
FIG. 2 is a process diagram outlining an embodiment of a synthesis method as disclosed herein.

The material as disclosed herein can form hydration complexes when mixed in polar solvents that can have various geometries which can vary based on factors such as the value of x. One non-limiting example of the structure and geometry of one example of the alkaline hydroxonium anion complex containing $H_4O_3^{2-}$ based on the structure as disclosed herein is depicted in FIG. 1. It is theorized that the alkaline hydroxonium anion $H_4O_3^{2-}$ will have two hydrogen atoms bonded to each respective oxygen atom in the anionic molecule with at least two of hydrogen atoms shared between each two respective oxygen atom. In the molecule depicted the alpha, beta and gamma oxygen atoms are sequentially oriented. The H—O—H bond angle for the beta oxygen ($\theta'$) is estimated to be between 105° to 108°; while the H—O—H bond angles for the alpha and gamma oxygen atoms ($\theta$, $\theta''$) are each estimated to be greater than 130° but less than 140°.

In certain embodiments, the value of x will be an integer between 4 and 7; while y is an integer that is less than x. In certain embodiments, y is an integer less than x and is an integer between 2 and 5. Non-limiting examples of specific formulae for the alkaline hydroxonium ion complex as disclosed include complexes such as $H_5O_2^{2-}$; $H_6O_5^{2-}$; $H_7O_2^{2-}$–$H_3O_4^{2-}$.

In certain embodiments, the composition of matter can be present in a polar or semi-polar solution as a dissociated or partially disassociated complex having the following chemical structure:

$$H_xO_{x-y}^{a-}Z^{b+}$$

wherein x is an integer greater than 3;
y is an integer less than x;
a is a value between 1 and 6;
b is a value between 1 and 3;
Z is a monoatomic cation, polyatomic cation or cationic complex.

The anion $H_xO_{x-y}^{a-}$ can be present as individual ions or can be present in loose coordinated clustered relationships and may form stable hydration complexes in certain instances. It is also contemplated that the anion $H_xO_{x-y}^{a-}$ can be present in a mixture of that includes a percentage of individual ions and a percentage of stable hydration complexes. In certain embodiments, the percentage of individual ions as a portion of the total anion present will be between 10% and 50%.

The polyatomic cation Z can be derived from materials having at least one amphoteric radical. In certain embodiments, the polyatomic cation employed can be an amphoteric cation having a charge of +2 or greater. Non-limiting examples of such cations include sulfate, carbonate, phosphate, chromate, dichromate, polyphosphate, orthophosphate and mixtures thereof. In certain embodiments, it is contemplated that the amphoteric polyatomic cation can be derived from acids having $pK_a$ values ≤1.7.

The monoatomic cation Z can be derived from alkali, alkali earth metal, transition metals, post transition metals and the like. In certain embodiments, these monoatomic cations can be Group 1 materials such as lithium, sodium, and potassium; Group 2 materials such as beryllium, magnesium, calcium, Group 4 materials such as titanium, Group 5 materials such as vanadium and niobium; Group 6 materials such as chromium and molybdenum; Group 7 material such as manganese; Group 8 materials such as iron; Group 9 materials such as cobalt; Group 10 materials such as nickel and palladium; Group 11 materials such as copper, silver and gold; Group 12 materials such as zinc and cadmium; and Group 13 materials such as aluminum. The monoatomic cations can have a charge of +1 or greater.

In certain embodiments, the monoatomic cation Z will have a charge equal to or greater than +2. Non-limiting examples of such materials include the Group 2 materials as well as aluminum. Other cations having a charge of +2 or greater that are contemplated include iron(III), iron(II), copper(II), cobalt(III), cobalt(II), tin(II), tin(IV), lead(II), lead(IV), mercury(II) and mercury(I).

Suitable cation complexes Z that can be employed include, but are not limited to, boron-magnesium complexes such as boron-nickel, boron-lithium, magnesium-lithium, magnesium-silicon, and lithium-silicon. The cation complex employed will typically have a charge of +2 or greater.

In many situations, the stable alkaline electrolyte material as disclosed herein is stable at standard temperature and pressure and can exist as a water-like liquid having wetting characteristics less than water; i.e. less than 70 dynes/cm. The electrolyte material as disclosed herein can be added to water or other polar organic solvents to produce a solution that contains an effective concentration of stable hydronium anion material in either the non-dissociated state, the dissociated state or a combination of the two that is greater than 1 part per million. In certain applications the electrolyte material can be present in concentrations greater than 0.05% by weight. It is contemplated that the alkaline electrolyte material can be present at concentration maximums up to between 10 to 1 mole ratio equivalents and 5 to 1 mole ratio equivalents. That is, it would take approximately 10 molar equivalents of a suitable standard inorganic acid, for example hydrochloric acid, to neutralize one mole of the material disclosed herein. In certain embodiments, the alkaline electrolyte material can be present in solution in an amount between 0.05% by weight and 50% by weight with concentrations between 1% and 30% by weight being possible in some embodiments. In certain embodiments, it is contemplated that the concentration will be between 1 ppm and 25% by weight.

It has been found, quite unexpectedly, that the hydroxonium anion derived from the addition of the stable alkaline electrolyte material disclosed herein to the desired solution alters the acid functionality of the resulting material without the concomitant alteration of the ration of free to total acid present in the solution. The alteration in acid functionality of the associated solution can include characteristics such as changes in measured pH, changes in free-to-total acid ratio, changes in specific gravity and rheology. Changes in spectral and chromatography output in the resulting solution may also be noted as compared to the analogous incumbent materials used in production of the stable alkaline electrolyte material that contains the alkaline hydroxonium ion complex disclosed herein. Addition of the stable hydroxonium ion material as disclosed herein results in changes in $pK_b$ which do not correlate with the changes that would be typically observed in free-to-total acid ratio.

Thus, the addition of the stable alkaline hydroxonium electrolyte material as disclosed herein to an aqueous solution having a pH between 6 and 8 results in a solution having an effective $pK_b$ between 8 and 14. It is also to be understood that $K_b$ of the resulting solution can exhibit a value greater than 14 when measured by a calomel electrode, specific ion ORP probe. As used herein the term "effective $pK_b$" is defined as a measure of the total available hydroxonium anion concentration present in the resulting solvent or solution and can be defined as the inverse reciprocal of $pK_a$. Given the performance characteristics of various probes and measurement devices, it is possible that pH and/or associated $pK_a$ of a material when measured may have a numeric value represented between 7 and 16.

Typically, the pH of a solution is a measure of its proton concentration. Proton concentration is generally held to be the inverse proportion of the —OH moiety present. It is believed that the stable alkaline electrolyte material disclosed herein, when introduced into a matrix such as a polar solution, facilitates at least partial coordination of hydrogen protons with the hydroxonium anion electrolyte material and/or its associated complex existing as complexes of one or more hydroxonium ions in complex with one another. As such, the introduced stable hydroxonium anion as disclosed herein exists in a state that permits selective functionality of the introduced hydroxyl moieties relative to other components present in the associated matrix such as the polar solution.

More specifically, the stable electrolyte material as disclosed herein can have the general formula:

x is an integer ≥4;
y is an integer less than x;
n is an integer between 1 and 4; and
Z is an amphoteric polyatomic ion having a charge between +1 and +3.

Amphoteric polyatomic constituents include carbonate, hydrogen carbonate, chromate, cyanide, nitride, nitrate, permanganate, phosphate, sulfate, sulfite, chlorite, perchlorate, hydrobromite, bromite, bromate, iodide, hydrogen sulfate, hydrogen sulfite. It is contemplated that the composition of matter can be composed of a single one to the materials listed above or can be a combination of one or more of the compounds listed.

It is also contemplated that, in certain embodiments, x is an integer between 3 and 9, with x being an integer between 3 and 6 in some embodiments. It is contemplated that the composition of matter can exist as an isomeric distribution in which the value x is an average distribution of integers greater than 3 favoring integers between 4 and 6.

In certain embodiments, y is an integer having a value of y=1, and, where applicable, y=2 or y=3.

The composition of matter as disclosed herein can have the following formula, in certain embodiments:

x is an integer between 4 and 6;
y is an integer less than x and between 1 and 3; and
Z is an amphoteric polyatomic ion having a charge between 1 and 3 and can be one of more of the following: carbonate, hydrogen carbonate, chromate, cyanide, nitride, nitrate, permanganate, phosphate, sulfate, sulfite, chlorite, perchlorate, hydrobromite, bromite, bromate, iodide, hydrogen sulfate, hydrogen sulfite.

The composition of matter as disclosed herein can be formed by the addition of a suitable inorganic acid to a suitable inorganic hydroxide. The inorganic acid that is introduced in the inorganic hydroxide may have a density between 22° and 70° baume; with specific gravities between about 1.18 and 1.93. In certain embodiments, it is contemplated that the inorganic acid will have a density between 50° and 67° baume; with specific gravities between 1.53 and 1.85. The inorganic acid can be either a monoatomic acid or a polyatomic acid.

The inorganic acid can be homogenous or can be a mixture of various acid compounds that fall within the defined parameters. It is also contemplated that the acid may be a mixture that includes one or more acid compounds that fall outside the contemplated parameters but in combination with other materials will provide an average acid composition value in the range specified. The inorganic acid or acids employed can be of any suitable grade or purity. In certain instances, tech grade and/or food grade material can be employed successfully.

The inorganic hydroxide material employed can be a water-soluble or partially water-soluble inorganic hydroxide. Partially water-soluble hydroxides employed in the process will generally be those which exhibit miscibility with the acid material to be added. Non-limiting examples of suitable partially water-soluble inorganic hydroxides will be those that exhibit at least 50% miscibility in the associated acid. The inorganic hydroxide can be either anhydrous or hydrated.

Non-limiting examples of water-soluble inorganic hydroxides include water soluble alkali metal hydroxides, alkaline earth metal hydroxides and rare earth hydroxides; either alone or in combination with one another. Other hydroxides are also considered to be within the purview of this disclosure. "Water-solubility" as the term is defined in conjunction with the hydroxide material that will be employed is defined a material exhibiting dissolution characteristics of 75% or greater in water at standard temperature and pressure. The hydroxide that is utilized typically is a liquid material that can be a true solution, a suspension or super-saturated slurry. In certain embodiments, it is contemplated that the concentration of the inorganic hydroxide in aqueous solution can be dependent on the concentration of the associated acid. Non-limiting examples of suitable concentrations for the hydroxide material are hydroxide concentrations greater than 5 to 50% of a 5 mole material.

Suitable materials include, but are not limited to, lithium hydroxide, sodium hydroxide, potassium hydroxide, ammonium hydroxide, calcium hydroxide, strontium hydroxide, barium hydroxide, magnesium hydroxide, and/or silver hydroxide. Inorganic hydroxide solutions, when employed may have concentration of inorganic hydroxide between 5 and 50% of a 5 mole material with concentration between 5 and 20% in certain applications. The inorganic hydroxide material, in certain processes, can be calcium hydroxide in a suitable aqueous solution such as present as slaked lime.

In preparing the stable electrolyte material as disclosed herein, an inorganic hydroxide can be contained in any suitable reaction vessel in liquid form at any suitable volume. In various embodiments, it is contemplated that the reaction vessel can be non-reactive beaker of suitable volume. The volume of inorganic hydroxide that can be employed can be a small as 50 ml. Larger volumes up to and including 5000 gallons or greater are also considered to be within the purview of this disclosure.

The inorganic hydroxide can be maintained in the reaction vessel at a temperature that is generally ambient. It is possible to maintain the initial inorganic base temperature in a range between approximately 23° and about 70° C. However lower temperatures in the range of 15° and about 40° C. can also be employed.

The inorganic hydroxide can be mechanically agitated by suitable means to impart mechanical energy at a level between approximately 0.5 HP and 3 HP with agitation levels imparting mechanical energy between 1 and 2.5 HP being employed in certain applications of the process. Agitation can be imparted by a variety of suitable means including but not limited to DC servodrive, electric impeller, magnetic stirrer, chemical inductor and the like.

Agitation can commence at an interval immediately prior to acid addition and can continue for an interval during at least a portion of the acid introduction step.

The acid material that is to be introduced may be maintained in any suitable vessel from which the material can be dispensed in a measured metered manner. The vessel can include suitable heating elements if desired or required that are configured to provide heated material at a temperature between ambient and approximately 200° F.; with temperatures between ambient and 70° C. being employed in certain embodiments.

In the process as disclosed herein, the acid material of choice may be a concentrated acid with an average molarity (M) of at least 7 or above. In certain procedures, the average molarity will be at least 10 or above; with an average molarity between 7 and 10 being useful in certain applications. The acid of employed may exist and a pure liquid, a liquid slurry or as an aqueous solution of the dissolved acid in essentially concentrated form.

Suitable acid materials can be either aqueous or non-aqueous materials. Non-limiting examples of suitable acid materials can include one or more of the following: hydrochloric acid, nitric acid, phosphoric acid, chloric acid, perchloric acid, chromic acid, sulfuric acid, permanganoic acid, prussic acid, bromic acid, hydrobromic acid, hydrofluoric acid, iodic acid, fluoboric acid, fluosilicic acid, fluotitanic acid.

In certain embodiments, the concentrated strong acid employed can be sulfuric acid having a specific gravity between 30° and 67° baume. This material can be placed can be place in the reaction vessel and mechanically agitated at a temperature between 16° and 70° C.

In certain specific applications of the method disclosed a measured, defined quantity of the suitable acid material can added to a defined amount of agitating hydroxide that is present in the vessel. The total amount of acid added will be that sufficient to produce a solution having a concentration of hydroxonium anion in a range between 6% by weight and 10% by weight. The method employed will be one that reduces or eliminates production precipitant by-product formation and yields a minimal volume of precipitant exhibiting a generally amorphous morphology.

In the process as disclosed, the acid material is added to the agitating inorganic hydroxide in one or more metered volumes over a defined interval to provide a defined total resonance time interval ($T_R$). The resonance time interval ($T_R$) in the process as outlined is considered to be the time interval necessary to promote and provide the environment in which the hydroxonium anion material develops. The resonance time interval ($T_R$) as employed herein is typically between 12 and 120 hours with resonance time intervals ($T_R$) between 24 and 72 hours and increments therein being utilized in certain applications.

In various applications of the process, the acid is introduced over time into the inorganic hydroxide at the upper surface in a plurality of metered volumes. Typically, the total amount of the acid material will be introduced in a plurality of cycles, generally occurring at the beginning of the resonance time interval ($T_R$) and proceeding for a portion of the total resonance time interval that follows. The portion of the resonance time interval during which acid addition occurs is referred to as ($T_A$). Generally during the $T_A$ interval, the acid can be added in a plurality of defined addition cycles. In certain situations, the addition cycles can be rear-loaded. "Rear-loaded addition", as the term is used herein, is taken to mean that the amount of acid added during the first 25% of $T_A$ is less than the volume of acid added during the final 25% of $T_A$.

It is to be understood that the proportion of available acid in each metered volume that is added can be the same or can vary based on such non-limiting factors as external process conditions, in situ process conditions, specific material characteristics, vessel geometry, and the like.

It is contemplated that the number of metered addition volumes can be between 2 and 12. The interval between additions of each metered volume can be between 5 and 60 minutes in certain applications of the process as disclosed. The actual addition interval can be between 60 minutes to five hours.

The metered volumes can vary in quantity and interval based on the desired reaction. In certain applications, it has been unexpectedly found that non-linear addition cycles will promote formation of the hydronium anion material as disclosed herein. Thus, it is contemplated that, in certain applications, the initial addition portions will have smaller volumes and/or be added over longer individual addition intervals than later added portion. It is also contemplated that the metered addition volumes can vary in concentration and/or composition with lower acid concentration volumes and/or lower strength acids being added earlier in the process.

In certain applications of the process, a 100 ml volume of 66° baume concentrated sulfuric acid material is added to 50 ml of 50% by weight calcium hydroxide in water. Addition can proceed in 5 metered increments of 2 ml per minute with admixture. Addition of the sulfuric acid to the calcium hydroxide solution results in increasing liquid turbidity that evidences production of calcium sulfate solids as precipitate or suspended/dissolved solids that is removed in a fashion coordinated with continued acid addition in order to provide a minimum concentration of suspended and dissolved solids.

Without being bound to any theory, it is believed that the addition of sulfuric acid to calcium hydroxide results in the consumption of the initial hydrogen proton or protons associated with the introduced sulfuric acid. This results in hydrogen proton oxygenation such that the proton in question is not off-gassed as would be predicted upon acid addition. Instead the proton in question is recombined and restructured with ionic water molecule components present in the liquid material.

The acid addition resonance interval ($T_A$) is generally less than the total resonance interval ($T_R$) in most applications. Once acid addition has been completed, the resulting material can be held at a temperature between 25° C. and 70° C. for an additional resonance process interval ($T_P$) to permit further reaction and bond formation and orientation. $T_P$ can be between 60 minutes and 72 hours and can proceed with or without agitation. In general $T_A+T_P=T_R$ and it is believed that between 75% and 95% of the hydronium anion is formed during $T_R$.

After completion of the suitable resonance time $T_R$, the material produced may be subjected to a non-bi-polar magnetic field at a value greater than 2000 gauss; with magnetic fields great than 2 million gauss being employed in certain applications. It is contemplated that a magnetic field between 10,000 and 2 million gauss can be employed in certain situations. One non-limiting example of a suitable magnetic field generator is found in U.S. Pat. No. 7,122,269 to Wurzburger, the specification of which is incorporated by reference herein. The material produced can be exposed to the desired magnetic field for a magnetic field dwell interval ($M_D$) that is between 5 minutes and 24 hours.

At least a portion of the solid material present as precipitate or suspended solid byproducts can be removed by any suitable means. Solid by-product removal generally occurs prior to magnetic field exposure and or any concentration processes. Suitable removal means include but need not be limited to the following: gravimetric, forced filtration, centrifuge, reverse osmosis and the like.

The composition of matter as disclosed herein is a shelf-stable viscous liquid that is believed to be stable for at least one year when stored at ambient temperature and 50 to 75% relative humidity. The composition of matter can be use neat or diluted for in various end use applications. The composition of matter can have a 1.87 to 1.78 molar solution that contains 6 to 10% of the total moles of alkaline hydronium material that are not charged balanced.

The stable electrolyte composition of matter which results from the process as disclosed has molarity of 200 to 150 M strength, and 187 to 178 M strength in certain instances, when measured titrimtrically and gravimetrically to provide a measure of effective $pK_b$ relative to pH. The material has a gravimetric range greater than 1.05; with ranges greater than 1.5 in certain instances.

It is also contemplated that the composition of matter as disclosed can be introduced into a polar solvent and will result in a solution having concentration of alkaline hydroxonium anions greater than 15% by volume. In some applications, the concentration of alkaline hydroxonium anions can be greater than 25% and it is contemplated that the concentration of alkaline hydroxonium anions can be between 15 and 50% by volume.

The polar solvent can be either aqueous, or a mixture of aqueous and organic materials. In situations where the polar solvent includes organic components, it is contemplated that the organic component can include at least one of the following: saturated and/or unsaturated short chain alcohols having less than 5 carbon atoms, and/or saturated and unsaturated short chain carboxylic acids having less than 5 carbon atoms. Where the solvent comprises water and organic solvents, it is contemplated that the water to solvent ratio will be between 1:1 and 400:1, water to solvent, respectively.

The ionic complex that is present in the solvent material as describes herein may have any suitable structure and solvation that is generally stable and capable of functioning as a hydroxyl donor in the presence of the environment created to generate the same. Particular embodiments, the alkaline hydroxonium ion complex is depicted by the following formula:

$[H_xO_{x-y}]_n^-$ wherein x is an integer ≥4;
y is an integer less than x;
n is an integer between 1 and 4.

It is contemplated that alkaline hydronium ion as defined herein exists in unique anion complexes having between 4 and 7 hydrogen atoms in complex with a lesser number of oxygen atoms in each individual anion complex. These are referred to in this disclosure as alkaline hydroxonium anion complexes. As used herein the term "alkaline hydroxonium anion complex" can be broadly defined as the cluster of molecules that surround the cation $H_xO_{x-y}$ where x is an integer greater than or equal to 4. The alkaline hydronium anion complex may include at least four additional hydrogen molecules and a stoichiometric proportion of oxygen molecules bonded or complexed thereto as water molecules. Thus, the formulaic representation of non-limiting examples of the alkaline hydroxonium anion complexes that can be employed in the process herein can be derived from the material depicted by the formula in FIG. 1.

In certain embodiments, the composition of matter is composed of a stoichiometrically balanced stable hydroxyl acid hydrate of hydrogen peroxide wherein the acid hydrate component is at least one of sulfuric hydrate, chromate hydrate, carbonate hydrate, phosphate hydrate, polyphosphate hydrate, orthopolyphosphate hydrate and mixtures thereof, The material herein can include hydrogen peroxide hydroxyl sulfate hydrate; hydrogen peroxide hydroxyl chromate hydrate; hydrogen peroxide hydroxyl carbonate; hydrogen peroxide hydroxyl phosphate hydrate; hydrogen peroxide hydroxyl polyphosphate hydrate; hydrogen peroxide hydroxyl orthopolyphosphate hydrate and mixtures thereof. In certain embodiments, the material will be a stable salt of hydrogen(1+), trihydroxy.

It is to be understood that the stable salt of hydrogen(1+), trihydroxy can be present alone or in combination with various fractions and complexes with materials including $H_5O_2$; $H_6O_5$; $H_7O_2$ being non-limiting examples.

In order to further illustrate the present disclosure, attention is directed to the following examples. The examples are included for illustrative purposes and are to be considered non-limitative of the present disclosure.

Example I

In order to prepare the stable basic electrolyte as disclosed herein, a 100 ml volume of 66° baume concentrated sulfuric acid liquid is introduced into a glass beaker and maintained with agitation at a temperature of 50° C. Imparted agitation proceeds at a rate that imparts mechanical energy into the solution at a level of 1 HP using a magnetic stirrer. The acid material employed has an average molarity of 8.

A 200 ml portion of concentrated calcium hydroxide solution is added to the upper region of the agitating sulfuric acid liquid an incremental fashion. The concentrated calcium hydroxide solution is a 5 molar material having a concentration of 40%. The 200 ml portion is divided into five portions of unequal volume, with an initial two portions to be added each being 50 ml and the next portion being 40 ml and the final two portions being 30 ml each. Each portion is added over an interval of 60 minutes with a resonance interval between portion addition is between 2 hours and 7 hours with greater resonance time intervals gradually increasing and resonance time intervals occurring later in the addition cycle. Metered addition occurs over a period of 72 hours. Agitation is discontinued prior to addition of the second portion.

Addition of the hydroxide material to the sulfuric acid results produces a material having increasing liquid turbidity. Increasing liquid turbidity is indicative of calcium sulfate solids as precipitate. The produced solids are removed from the liquid by gravity filtration as required.

The composition of the gaseous material produced in the reaction is monitored during addition to assess generation of hydrogen gas generated. Addition rates are modified to limit hydrogen gas generation.

Upon completion of the final resonance interval, the resulting liquid material is decanted into a container and subjected to a non-bi-polar magnetic field at a value of 5000 for an interval of 5 hours. The resulting material is a viscous fluid.

Example II

A sample of the material produced according to the method outlined in the Example II is analyzed using hydrogen coulometry and determined to have a molarity of 180 M. The material is analyzed via FFTIR and spectral analysis. Representative results resolve to the illustrated in Figure I. The material is found to have a gravimetric range greater than 1.5 and yields up to 1300 volumetric times of orthohydrogen per cubic milliliter versus hydrogen contained in a mole of water.

A 20 ml portion of the material produced according to the method outlined in the Example I is placed in a stoppered container and stored at ambient temperature between a humidity between 50 and 75%. The material is analyzed and the results are within 5% of the results measured at manufacture indicated shelf stability.

Example III

A 500 ml portion of the basic material as disclosed herein is prepared according to the process outlined in Example I. Portions of the material is analyzed using the procedure outlined in ASTM-D2624 to determine conductivity. The material exhibited a value of 16,000 μmhos/cm. When a portion of the sample is analyzed by ion chromatography using EPA method SW9056A, the material is found to contain less than 50 mg/l chloride; less than 50 mg/l nitrogen as nitrogen or nitrate and 1400 mg/l to 1500 mg/l sulfate. This is taken to indicate that the material is present as sulfate.

When portions of the sample are analyzed according to the procedure outlined in ASTM-D891 and D4052 the specific gravity is measured as being between 1.09 and 1.13.

The alkalinity of the material is determined using the process outlined in Method A2320—Standard Method for Examination of Water and Wastewater. Alkalinity due to bicarbonate (as $CaCO_3$) is not detected. Alkalinity die to carbonate (as $CaCO_3$) is present at a level of 400 mg/L. Alkalinity due to the presence of hydroxide (measured as ($CaCO_3$) is present as a level of 2000 mg/L. Total alkalinity is 2400 mg/L with over 80% being present as hydroxide. Total solids in the sample portions are determined to be 6300 mg/L as determined by the method outlined in A2540B—

Standard Method for Determination of Solids in Water. Of this value, 6300 mg/L is total dissolved solids (TDS) as determined by Method A2540C. The pH of the material is determined using the method outlined in A4500-H+B as 13.

Although embodiments have been described above with reference to the accompanying drawings, those of skill in the art will appreciate that variations and modifications may be made without departing from the scope thereof as defined by the appended claims.

What is claimed is:

1. An alkaline hydronium composition produced by the process comprising the steps of:
    reacting at least one strong inorganic acid with a strong inorganic base, wherein the at least one strong inorganic acid selected from the group consisting of hydrochloric acid, nitric acid, phosphoric acid, chloric acid, perchloric acid, chromic acid, sulfuric acid, permanganoic acid, prussic acid, bromic acid, hydrobromic acid, hydrofluoric acid, iodic acid, fluoboric acid, fluosilicic acid, fluotitanic acid and mixtures thereof and the strong inorganic base has a density between 22° and 70° baume, wherein the at least one strong inorganic acid is added to the strong inorganic base in a metered manner to provide a resonance time interval of between 12 and 120 hours; and
    after metered addition is complete, exposing the resulting material to a non-bi-polar magnetic field at a value greater than 2000 gauss for an interval between 5 minutes and 24 hours;
    wherein the alkaline hydronium composition comprises a stoichiometrically balanced stable hydroxyl acid hydrate of hydrogen peroxide wherein the acid hydrate component is at least one of sulfuric hydrate, chromate hydrate, carbonate hydrate, phosphate hydrate, polyphosphate hydrate, orthopolyphosphate hydrate and mixtures thereof.

2. The composition of claim 1 wherein the inorganic base is an inorganic hydroxide that exhibits dissolution characteristics of at least 75% in water at a concentration of 5 moles and has a hydroxide concentration greater than 5 to 50% of a 5 mole concentration in water.

3. The composition of claim 1 wherein the inorganic base is selected from the group consisting of lithium hydroxide, sodium hydroxide, potassium hydroxide, ammonium hydroxide, calcium hydroxide, strontium hydroxide, barium hydroxide, magnesium hydroxide, silver hydroxide and mixtures thereof.

4. The composition of claim 1 wherein the at least one strong inorganic acid being added has an average molarity greater than 7M.

5. The composition of claim 1 wherein the at least one strong inorganic acid is sulfuric acid.

6. The composition of claim 5 wherein the at least one strong inorganic acid is sulfuric acid having a specific gravity between 30° and 67° baume.

7. The composition of claim 6 wherein the amount of sulfuric acid is sufficient to produce a solution having a concentration of hydroxonium anion in a range between 6% by weight and 10% by weight.

8. The composition of claim 1 wherein the at least one strong inorganic acid is added to a strong inorganic base selected from the group consisting of lithium hydroxide, sodium hydroxide, potassium hydroxide, ammonium hydroxide, calcium hydroxide, strontium hydroxide, barium hydroxide, magnesium hydroxide, silver hydroxide and mixtures thereof present as an aqueous solution having a hydroxide concentration than 5 to 50% of a 5 M material under agitation in at least one metered volume to provide a total resonance time interval between 12 and 120 hours.

9. The composition of claim 8 wherein the strong acid is added in a plurality of metered volumes, wherein at least one first volume is smaller than at least one later volume.

10. The composition of claim 9 wherein the at least one strong inorganic acid is added to the strong inorganic base over an acid addition resonance interval, wherein the total resonance interval is greater than the acid addition resonance interval.

11. The composition of claim 1 wherein addition of the strong inorganic acid to the strong inorganic base produces a solid by-product, wherein the process further comprises the step of removing at least a portion of the solid by-product, the solid by-product removal step occurring prior to the magnetic exposing step.

12. The composition of claim 1 wherein the alkaline hydronium composition is a stable electrolyte composition of matter that has a 1.87 to 1.78M solution that contains 6 to 10% of the total moles of alkaline hydronium material that are not charged balanced.

13. The composition of claim 1 wherein the alkaline hydronium composition is composed of a stoichiometrically balanced stable hydroxyl acid hydrate of hydrogen peroxide wherein the acid hydrate component is at least one of sulfuric hydrate, chromate hydrate, carbonate hydrate, phosphate hydrate, polyphosphate hydrate, orthopolyphosphate hydrate and mixtures thereof, The material herein can include hydrogen peroxide hydroxyl sulfate hydrate; hydrogen peroxide hydroxyl chromate hydrate; hydrogen peroxide hydroxyl carbonate; hydrogen peroxide hydroxyl phosphate hydrate; hydrogen peroxide hydroxyl polyphosphate hydrate; hydrogen peroxide hydroxyl orthopolyphosphate hydrate and mixtures thereof.

14. The composition of claim 13 wherein the alkaline hydronium composition is composed of a stoichiometrically balanced chemical salt of hydrogen(1+), trihydroxy, wherein the salt is at least one of the following sulfate, carbonate, phosphate, oxalate, chromate, dichromate, pyrophosphate and mixtures thereof.

15. The composition of claim 14 wherein the composition of matter comprises salts of at least one of the following $H_4Q_3$, $H_5O_2$; $H_6O_5$; $H_7O_2$.

16. An alkaline hydronium composition produced by the process comprising the steps of:
    reacting at least one strong inorganic acid with a strong inorganic base, wherein the at least one strong inorganic acid is selected from the group consisting of hydrochloric acid, nitric acid, phosphoric acid, chloric acid, perchloric acid, chromic acid, sulfuric acid, permanganoic acid, prussic acid, bromic acid, hydrobromic acid, hydrofluoric acid, iodic acid, fluoboric acid, fluosilicic acid, fluotitanic acid and mixtures thereof, and the strong inorganic base has a density between 22° and 70° baume and a specific gravity between 1.18 and 1.93, wherein the at least one strong inorganic acid is added to the strong inorganic base in a metered manner to provide a resonance time interval of between 12 and 120 hours, the strong inorganic base being a liquid material experiencing agitation during addition; and
    after metered addition is complete, exposing the resulting material to a non-bi-polar magnetic field at a value greater than 2000 gauss for an interval between 5 minutes and 24 hours;
    wherein the strong inorganic base is selected from the group consisting of lithium hydroxide, sodium hydroxide, potassium hydroxide, ammonium hydroxide, calcium hydroxide, strontium hydroxide, barium hydroxide, magnesium hydroxide, silver hydroxide and mixtures thereof, the strong inorganic base composed of one or more inorganic materials present in combination sufficient to provide a specific gravity between 1.18 and 1.93; and wherein the alkaline hydronium composition comprises an alkaline hydronium compound that is a stoichiometrically balanced stable hydroxyl acid hydrate of hydrogen peroxide wherein the acid hydrate component is at least one of sulfuric hydrate, chromate hydrate, carbonate hydrate, phosphate hydrate, polyphosphate hydrate, orthopolyphosphate hydrate and mixtures thereof.

17. The composition of claim 16 wherein the alkaline hydronium compound has the general formula:

$$[H_xO_{x-y}]_m Z_n$$

wherein x is an integer greater than 3
y is an integer less than x;
m is an integer between 1 and 6;
n is an integer between 1 and 3; and
Z is selected from the group consisting of sulfate, carbonate, phosphate, oxalate, chromate, dichromate, pyrophosphate and mixtures thereof; and
wherein the alkaline hydronium ion comprises salts of at least one of the following: $H_4O_3$; $H_5O_2$; $H_6O_5$; $H_7O_2$.

* * * * *